United States Patent
Gila et al.

(10) Patent No.: US 10,712,630 B2
(45) Date of Patent: Jul. 14, 2020

(54) DISPLAY DEVICE

(71) Applicant: Hewlett-Packard Development Company, L.P., Houston, TX (US)

(72) Inventors: Omer Gila, Palo Alto, CA (US); Napoleon J Leoni, Palo Alto, CA (US); Alex Veis, Netanya (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 132 days.

(21) Appl. No.: 15/763,096

(22) PCT Filed: Oct. 27, 2015

(86) PCT No.: PCT/US2015/057498
§ 371 (c)(1),
(2) Date: Mar. 24, 2018

(87) PCT Pub. No.: WO2017/074311
PCT Pub. Date: May 4, 2017

(65) Prior Publication Data
US 2018/0275478 A1    Sep. 27, 2018

(51) Int. Cl.
*G02B 26/00* (2006.01)
*G02F 1/167* (2019.01)
(Continued)

(52) U.S. Cl.
CPC ............. *G02F 1/167* (2013.01); *G06F 3/044* (2013.01); *G02F 1/13338* (2013.01); *G02F 1/1676* (2019.01); *G02F 2001/1678* (2013.01)

(58) Field of Classification Search
CPC ...................................... G02F 1/167
(Continued)

(56) References Cited

U.S. PATENT DOCUMENTS 8,617,697 B2    12/2013    Kim et al.
2011/0234513 A1*    9/2011    Pan ............... G02F 1/167
                                                    345/173
(Continued)

FOREIGN PATENT DOCUMENTS

CN    202693966 U    1/2013
KR    10-2009-0097252 A    9/2009
(Continued)

OTHER PUBLICATIONS

Janglin Chen and Liu, C.T.; Technology Advances in Flexible Displays and Substrates; Ind. Technol. Res. Inst., Hsinchu, Taiwan May 10, 2013; http://ieeexplore.ieee.org/xpl/articleDetails.jsp?arnumber-6514818.

(Continued)

*Primary Examiner* — James C. Jones
(74) *Attorney, Agent, or Firm* — Dicke Billig & Czaja PLLC

(57) ABSTRACT

One example of a display device includes an electronic paper display, a counter-electrode, a floating electrode, and a patterned layer. The electronic paper display is imageable by receiving charges on an imaging surface of the electronic paper display. The counter-electrode is opposite to the imaging surface of the electronic paper display. The floating electrode is capacitively coupled to the counter-electrode. The patterned layer on the floating electrode provides mechanical protection for the floating electrode while enabling an air discharge to the floating electrode.

20 Claims, 4 Drawing Sheets

(51) Int. Cl.
    *G06F 3/044*    (2006.01)
    *G02F 1/1676*   (2019.01)
    *G02F 1/1333*   (2006.01)
    *G02F 1/1675*   (2019.01)

(58) Field of Classification Search
    USPC .......................................................... 359/296
    See application file for complete search history.

(56)                References Cited

U.S. PATENT DOCUMENTS

| 2012/0194898 A1 | 8/2012 | Tsai et al. |
| 2012/0320001 A1 | 12/2012 | Gila et al. |
| 2013/0050136 A1 | 2/2013 | Fan et al. |
| 2013/0114124 A1* | 5/2013 | Suwald .................. G02F 1/167 359/296 |
| 2014/0085573 A1 | 3/2014 | Pellerite et al. |
| 2014/0327452 A1 | 11/2014 | Petcavich et al. |

FOREIGN PATENT DOCUMENTS

| WO | WO-2007094070 | 8/2007 |
| WO | WO-2015-116210 A1 | 8/2015 |

OTHER PUBLICATIONS

Chen, Janglin et al. "Technology advances in flexible displays and substrates." IEEE Access 1 (2013): 150-158.

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

Figure 1:
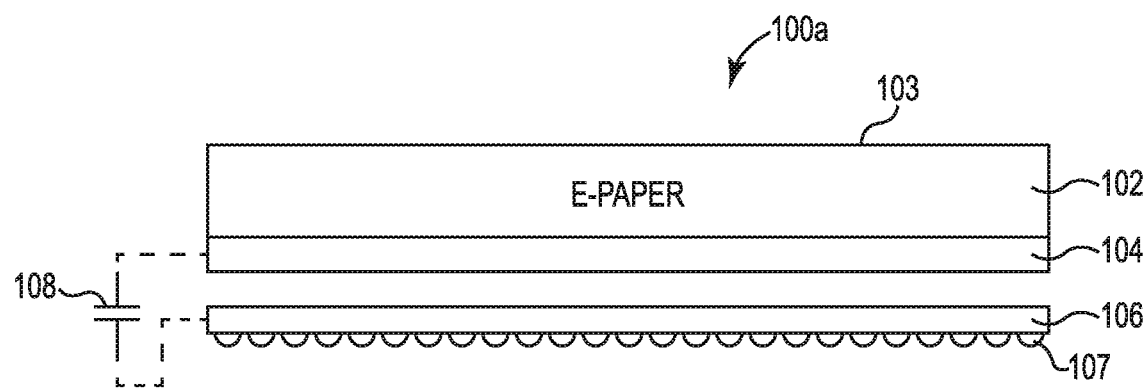
FIG. 1 is a schematic diagram illustrating one example of a display device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") may be used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

One way to write to e-paper is by generating a charge on a surface in proximately to a layer of microcapsules that contain charged pigment particles while connecting the other side of the e-paper to ground or another suitable voltage. The charge on the surface attracts or repels the charged pigment particles in the microcapsules to create the desired image. To write to e-paper, a writing module used to write to the e-paper has to maintain a connection to a ground return path (e.g., a counter-electrode) for the e-paper during the writing (or erasing) phase. Once the image is created, the surface charges are no longer required to maintain the image and the charges typically dissipate or are discharged through the e-paper to the ground. If the e-paper image is undesirably disrupted after writing by the close proximity (e.g., 0-200 µm) of a charged object, such as a finger of a person who is statically charged, the position of the pigment particles (and thus the image) may be disturbed.

Accordingly, the following disclosure describes examples of an e-paper display device that is imageable by receiving charges on an imaging surface of the e-paper display. The display device includes a counter-electrode opposite to the imaging surface of the e-paper display and a floating electrode capacitively coupled to the counter-electrode. In addition, the display device includes a patterned layer on the floating electrode to provide mechanical protection for the floating electrode while enabling an air discharge to the floating electrode. The floating electrode and patterned layer are placed on the display device where first contact with a user is most likely to occur (i.e., on the front and/or back side of the display device). When the floating electrode is subjected to an electric field/charge transfer from a user, the counter-electrode is brought to substantially the same potential as the floating electrode. In this way, subsequent contact by the user to the imaging surface of the e-paper display will not result in disruption of an image of the e-paper display. The patterned layer on the floating electrode prevents damage to the floating electrode when the display device is handled by a user.

FIG. 1 is a schematic diagram illustrating one example of a display device 100a. Display device 100a includes an e-paper display 102, a counter-electrode 104, a floating electrode 106, and a patterned layer 107. E-paper display 102 includes an imaging surface 103. The surface of e-paper display 102 opposite to imaging surface 103 contacts counter-electrode 104. Floating electrode 106 is on the same side of e-paper display 102 as counter electrode 104 but does not directly contact counter-electrode 104. Patterned layer 107 contacts floating electrode 106.

E-paper display 102 includes an active layer that switches color when electrical charges are applied to imaging surface 103. In one example, the active layer contains a switchable pigment or die combination. A resin or polymer may be used to encapsulate the active layer. In addition, e-paper display 102 may include a functional coating on the imaging surface. In one example, e-paper display 102 has a thickness between 70 µm and 300 µm. One example of e-paper display 102 is further described below with reference to FIG. 6.

Counter-electrode 104 provides an electrode for the imaging of e-paper display 102 by a writing module. During writing of e-paper display 102, counter charges flow to counter-electrode 104 from a writing module. Thus, display device 100a remains basically charge neutral despite charges being ejected onto imaging surface 103. Without a connection between counter-electrode 104 and the writing module, the amount of charges that may be ejected onto imaging surface 103 may be limited and thus information may not be reliably written to display device 100a. Counter-electrode 104 may be composed of a transparent conductive material, such as indium tin oxide. In one example, counter-electrode 104 has a thickness between 5 nm and 1 µm.

Floating electrode 106 is capacitively coupled to counter-electrode 104 as indicated by capacitor 108. Floating electrode 106 and patterned layer 107 provide an area of display device 100a that a user is likely to touch when first contacting display device 100a. When a user touches floating electrode 106 or patterned layer 107, floating electrode 106 is brought to the same potential as the user. Through the capacitive coupling to counter-electrode 104, counter-electrode 104 is brought to substantially the same potential as floating electrode 106. By bringing counter-electrode 104 to substantially the same potential as floating electrode 106, e-paper display 102 becomes insensitive to a future contact of the user's finger onto imaging surface 103 and subsequent electric field/charge transfer between the user and imaging surface 103 of e-paper display 102 is minimized. Thus, the user's ability to alter the displayed image of e-paper display 102 by handling display device 100a is reduced.

Floating electrode 106 may be composed of a transparent conductive material, such as a thin (e.g., less than 10 μm) conductive coating (e.g., indium tin oxide or a conductive polymer) deposited onto a clear insulating substrate. In one example, the clear insulating substrate has a thickness between 50 μm and 500 μm. Transparent conductive materials, such as indium tin oxide and conductive polymers may be easily scratched or removed by handling. Accordingly, by applying patterned layer 107 including a durable overcoat material on floating electrode 106, floating electrode 106 is protected from damage by handling.

Patterned layer 107 provides mechanical protection for floating electrode 106 while enabling an air discharge to floating electrode 106. Patterned layer 107 may be composed of a transparent material. Patterned layer 107 may be composed of an ultraviolet (UV) coating, a polymer coating, a water based coating, or another suitable nonconductive coating. Patterned layer 107 may cover between 5% and 95% of floating electrode 106 such that a portion of floating electrode 106 remains exposed. Patterned layer 107 may have a thickness less the 18 μm, such as between 2 μm and 10 μm. The thickness of patterned layer 107 is small enough such that as predicted by the Paschen curve, patterned layer 107 will have no effect on the function of floating electrode 106 when display device 100a is handled by a user.

Patterned layer 107 may be applied to floating electrode 106 via flexo printing, inkjet printing, or another suitable method. Halftoning or screening (e.g., FM screening, AM screening, line screening) of patterned layer 107 may be selected to maximize the protection of floating electrode 106, provide an acceptable image quality for e-paper display 102, and/or to minimize the cost of patterned layer 107. In one example, the frequency of dots of patterned layer 107 is 300 DPI or other suitable frequency that prevents most objects (e.g., fingernails) from reaching floating electrode 106. Therefore, patterned layer 107 prevents scratches and/or other damage to floating electrode 106.

Figure 2:
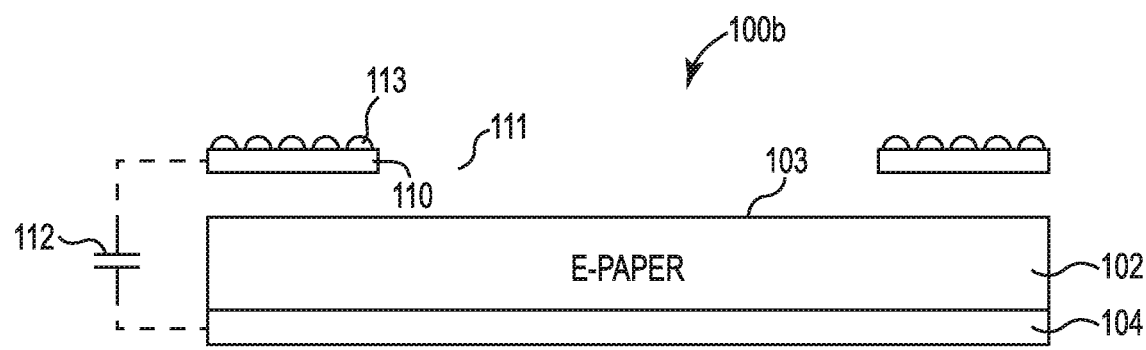
FIG. 2 is a schematic diagram illustrating another example of a display device.

FIG. 2 is a schematic diagram illustrating another example of a display device 100b. Display device 100b is similar to display device 100a previously described and illustrated with reference to FIG. 1, except that display device 100b includes a floating electrode 110 and a patterned layer 113 in place of floating electrode 106 and patterned layer 107. Floating electrode 110 is on the same side of e-paper display 102 as imaging surface 103. Floating electrode 110 includes an opening 111 exposing imaging surface 103 of e-paper display 102 to allow e-paper display 102 to be written. Patterned layer 113 contacts floating electrode 110.

Floating electrode 110 is capacitively coupled to counter-electrode 104 as indicated by capacitor 112. Floating electrode 110 may be composed of a transparent conductive material, such as a thin conductive material (e.g., indium tin oxide), a polycarbonate with bulk conductivity or surface conductivity, or an opaque conductive material, such as a metal. Floating electrode 110 and patterned layer 113 provide an area of display device 100b that a user is likely to touch when first contacting display device 100b. When a user touches floating electrode 110 or patterned layer 113, floating electrode 110 is brought to the same potential as the user. Through the capacitive coupling to counter-electrode 104, counter-electrode 104 is brought to substantially the same potential as floating electrode 110. By bringing counter-electrode 104 to substantially the same potential as floating electrode 110, subsequent electric field/charge transfer between the user and imaging surface 103 of e-paper display 102 is minimized. Thus, the user's ability to alter the displayed image of e-paper display 102 by handling display device 100b is reduced.

Patterned layer 113 provides mechanical protection for floating electrode 110 while enabling an air discharge to floating electrode 110. Patterned layer 113 may be composed of a transparent material or an opaque material. Patterned layer 113 may be composed of an UV coating, a polymer coating, a water based coating, or another suitable nonconductive coating. Patterned layer 113 may cover between 5% and 95% of floating electrode 110 such that a portion of floating electrode 113 remains exposed. Patterned layer 113 may have a thickness less the 18 μm, such as between 2 μm and 10 μm. The thickness of patterned layer 113 is small enough such that as predicted by the Paschen curve, patterned layer 113 will have no effect on the function of floating electrode 110 when display device 100b is handled by a user.

Patterned layer 113 may be applied to floating electrode 110 via flexo printing, inkjet printing, or another suitable method. Halftoning or screening (e.g., FM screening, AM screening, line screening) of patterned layer 113 may be selected to maximize the protection of floating electrode 110 and/or to minimize the cost of patterned layer 113. In one example, the frequency of dots of patterned layer 113 is 300 DPI or other suitable frequency that prevents most objects (e.g., fingernails) from reaching floating electrode 110. Therefore, patterned layer 113 prevents scratches and/or other damage to floating electrode 110.

Figure 3:
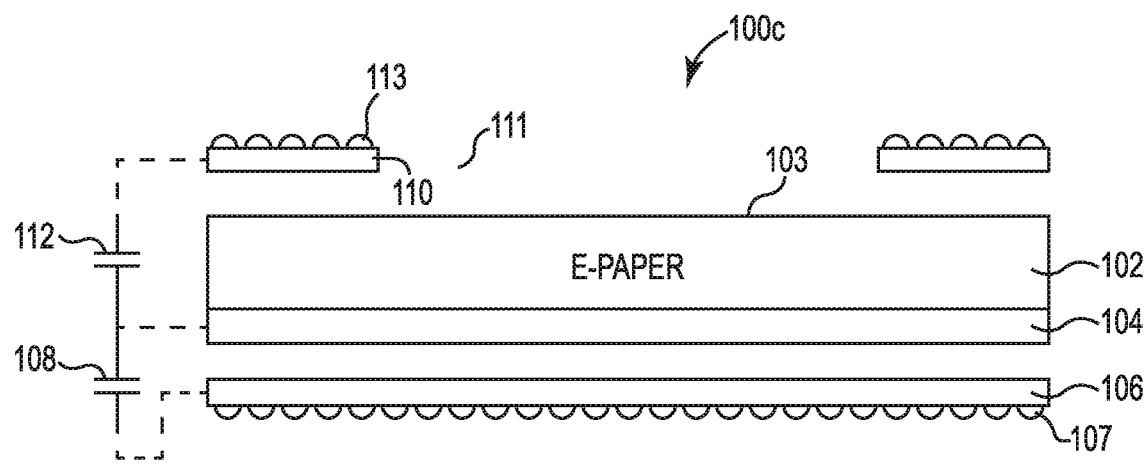
FIG. 3 is a schematic diagram illustrating another example of a display device.

FIG. 3 is a schematic diagram illustrating another example of a display device 100c. Display device 100c includes both a floating electrode 106 and patterned layer 107 previously described and illustrated with reference to FIG. 1 and a floating electrode 110 and patterned layer 113 previously described and illustrated with reference to FIG. 2. Floating electrode 106 and patterned layer 107, and floating electrode 110 and patterned layer 113, provide areas of display device 100c that a user is likely to touch when first contacting display device 100c. When a user touches floating electrode 106 or patterned layer 107, or floating electrode 110 or patterned layer 113, through capacitive coupling counter-electrode 104 is brought to substantially the same potential as floating electrode 106 and/or floating electrode 110. Thus, the user's ability to alter the displayed image of e-paper display 102 by handling display device 100c is reduced.

Figure 4:
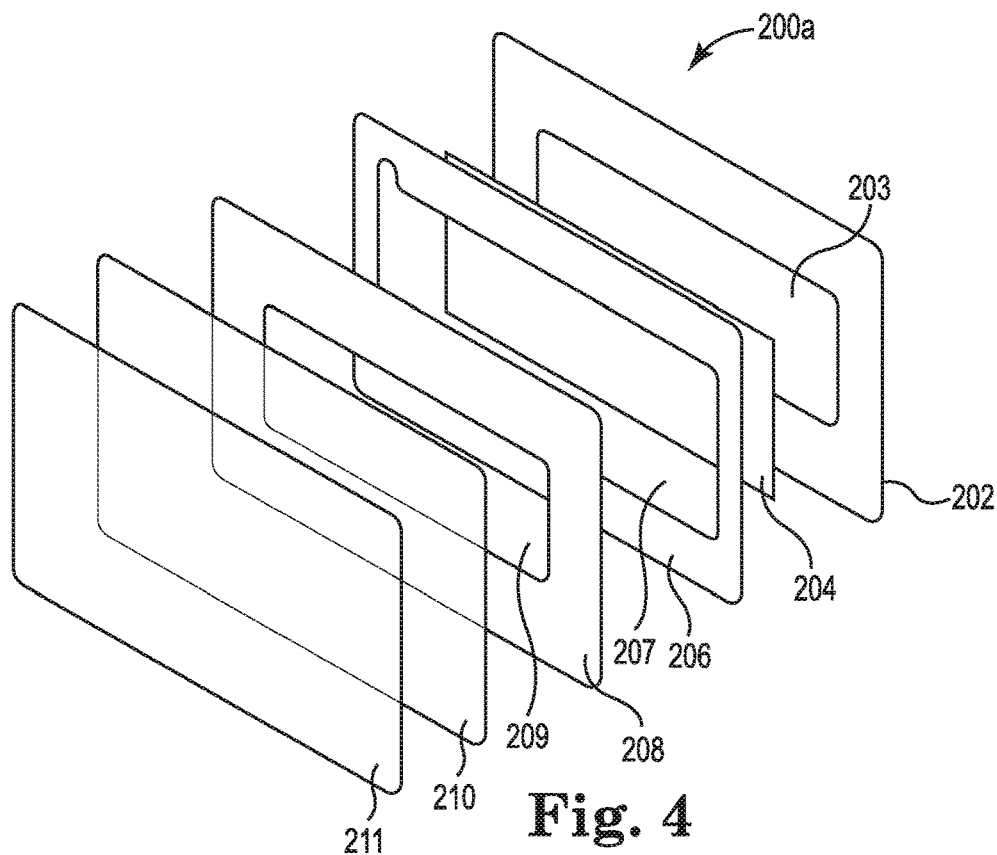
FIG. 4 is an exploded view illustrating one example of a display device.

FIG. 4 is an exploded view illustrating one example of a display device 200a. Display device 200a includes a first layer 202, an e-paper display 204, a second layer 206, a third layer 208, a floating electrode 210, and a patterned layer 211. First layer 202 includes an opening 203 to expose the imaging surface of e-paper display 204. First layer 202 may be composed of a nonconductive transparent or opaque material, such as a transparent or opaque polymer. Ink may be applied to first layer 202 either on the surface of first layer 202 facing away from second layer 206 or on the surface of first layer 202 facing second layer 206 (e.g., for a transparent first layer 202). First layer 202 is attached to second layer 206 and may cover a portion of e-paper display 204 around the edges of e-paper display 204.

E-paper display 204 includes a counter-electrode opposite to the imaging surface and facing third layer 208. E-paper display 204 is supported in an opening 207 of second layer 206. Second layer 206 may be composed of a conductive material, such as a metal or a polycarbonate. The counter-electrode of e-paper display 204 is electrically coupled to second layer 206. Third layer 208 is attached to second layer 206 and covers e-paper display 204. Third layer 208 includes a transparent window 209 to e-paper display 204 to enable viewing of e-paper display 204. Third layer 208 may be composed of a nonconductive transparent material, such as a transparent polymer. Ink may be applied to the edges of third layer 208 to provide a printed region defining window 209. The ink may be applied to third layer 208 either on the surface of third layer 208 facing away from second layer 206 or on the surface of third layer 208 facing second layer 206.

Floating electrode 210 is attached to third layer 208. Floating electrode 210 may be composed of a transparent conductive material, such as indium tin oxide or a polycarbonate. In one example, floating electrode 210 is a conductive coating that is applied to third layer 208. In another example, floating electrode 210 is a conductive film that is applied to third layer 208. Floating electrode 210 is capacitively coupled to the counter-electrode of e-paper display 204.

Patterned layer 211 provides mechanical protection for floating electrode 210 while enabling an air discharge to floating electrode 210. Patterned layer 211 may be composed of a transparent material. Patterned layer 211 may be composed of an UV coating, a polymer coating, a water based coating, or another suitable nonconductive coating applied to floating electrode 210. Patterned layer 211 may cover between 5% and 95% of floating electrode 210 such that a portion of floating electrode 210 remains exposed. Patterned layer 211 has no effect on the function of floating electrode 210 when display device 200a is handled by a user. In addition, patterned layer 211 prevents scratches and/or other damage to floating electrode 210.

Floating electrode 210 and patterned layer 211 provide an area of display device 200a that a user is likely to touch when first contacting display device 200a. When a user touches floating electrode 210 or patterned layer 211, floating electrode 210 is brought to the same potential as the user. Through the capacitive coupling to the counter-electrode of e-paper display 204, the counter-electrode is brought to substantially the same potential as floating electrode 210. By bringing the counter-electrode to substantially the same potential as floating electrode 210, subsequent electric field/charge transfer between the user and the imaging surface of e-paper display 204 is minimized. Thus, the user's ability to alter the displayed image of e-paper display 204 by handling display device 200a is reduced.

In one example, first layer 202, second layer 206, third layer 208, and floating electrode 210 may be attached to each other via an adhesive material between each of the layers, such as a pressure sensitive adhesive or a two part adhesive. In another example, first layer 202, second layer 206, third layer 208, and floating electrode 210 may be attached to each via thermal lamination, ultrasonic bonding/welding, or another suitable bonding method. In this example, display device 200a has the form of a transaction card, such as a credit card, debit card, prepaid card, or gift card. In other examples, display device 200a may have another suitable form, such as a shelf tag, boarding pass, shipping label, or large format flexible rewritable display.

Figure 5:
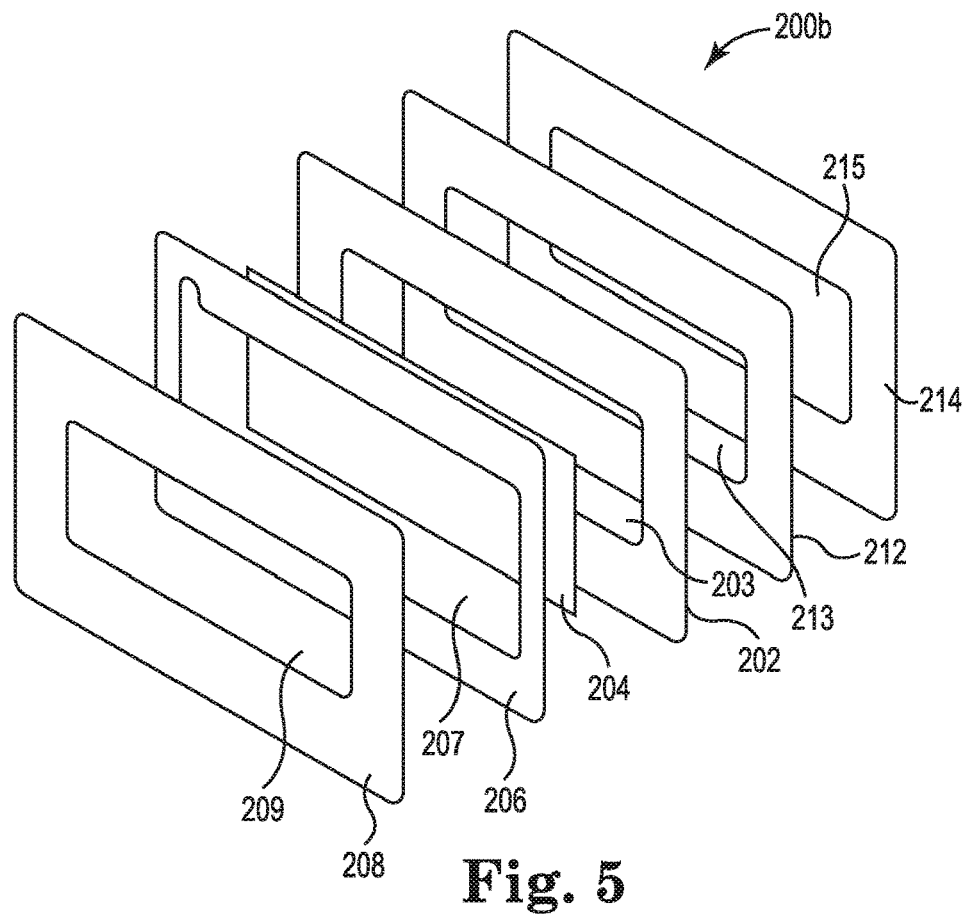
FIG. 5 is an exploded view illustrating another example of a display device.

FIG. 5 is an exploded view illustrating another example of a display device 200b. Display device 200b is similar to display device 200a previously described and illustrated with reference to FIG. 4, except that display device 200b includes a floating electrode 212 and patterned layer 214 in place of floating electrode 210 and patterned layer 211. Floating electrode 212 is attached to first layer 202. Floating electrode 212 includes an opening 212 and patterned layer 214 includes an opening 215 exposing the imaging surface of e-paper display 204 to allow e-paper display 204 to be written.

Floating electrode 212 may be composed of a transparent conductive material, such as indium tin oxide or a polycarbonate, or an opaque conductive material, such as a metal. In one example, floating electrode 212 is a conductive coating that is applied to first layer 202. In another example, floating electrode 212 is a conductive film that is applied to first layer 202. Floating electrode 212 is capacitively coupled to the counter-electrode of e-paper display 204.

Patterned layer 214 provides mechanical protection for floating electrode 212 while enabling an air discharge to floating electrode 212. Patterned layer 214 may be composed of a transparent material or an opaque material. Patterned layer 214 may be composed of an UV coating, a polymer coating, a water based coating, or another suitable nonconductive coating applied to floating electrode 212. Patterned layer 214 may cover between 5% and 95% of floating electrode 212 such that a portion of floating electrode 212 remains exposed. Patterned layer 214 has no effect on the function of floating electrode 212 when display device 200b is handled by a user. In addition, patterned layer 214 prevents scratches and/or other damage to floating electrode 212.

Floating electrode 212 and patterned layer 214 provide an area of display device 200b that a user is likely to touch when first contacting display device 200b. When a user touches floating electrode 212 or patterned layer 214, floating electrode 212 is brought to the same potential as the user. Through the capacitive coupling to the counter-electrode of e-paper display 204, the counter-electrode is brought to substantially the same potential as floating electrode 212. By bringing the counter-electrode to substantially the same potential as floating electrode 212, subsequent electric field/charge transfer between the user and the imaging surface of e-paper display 204 is minimized. Thus, the user's ability to alter the displayed image of e-paper display 204 by handling display device 200b is reduced. In another example, display device 200b may include a floating electrode 210 and patterned layer 211 attached to third layer 208 as previously described and illustrated with reference to FIG. 4 in addition to floating electrode 212 and patterned layer 214.

Figure 6:
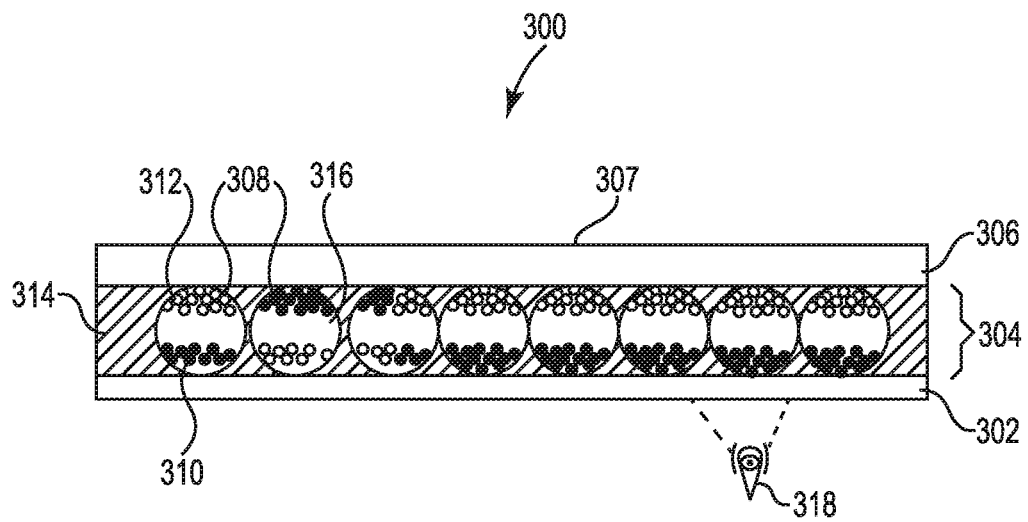
FIG. 6 is a cross-sectional view illustrating one example of an electronic paper ("e-paper") display.

FIG. 6 is a cross-sectional view illustrating one example of an e-paper display 300. In one example, e-paper display 300 is used in display device 100a, 100b, 100c, 200a, or 200b previously described and illustrated with reference to FIGS. 1-5, respectively. E-paper display 300 includes a transparent counter-electrode 302, an active layer 304, and a transparent charge receiving layer 306. Active layer 304 includes microcapsules 308 encapsulated by a resin or polymer 314 or other material that can hold the carrying liquid, which is typically a dielectric liquid such as isoparaffinic fluids. In one example, each microcapsule 308 includes black particles 310 and white particles 312 suspended in a fluid medium 316. Surface 307 of charge receiving layer 306 provides the imaging surface for e-paper display 300. Counter-electrode 302 provides the viewing side for a viewer 318 in this example. In other examples, charge receiving layer 306 may provide the viewing side for a viewer.

Ambient light is transmitted through counter-electrode 302, strikes microcapsules 308, and is reflected back to the viewer 318. When white particles 312 of a microcapsule 308 are located near counter-electrode 302, the microcapsule appears white to a viewer 318. When black particles 310 of a microcapsule 308 are located near counter-electrode 302, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near counter-electrode 302 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 may be adapted to specific design criteria. In one example, the transparent charge receiving layer 306 may be composed of a transparent polymer and may have a thickness between 50 µm and 250 µm. The transparent charge receiving layer 306 may also be composed of a material that holds charges or is porous or semi-porous to charges and/or ions.

The diameter of each microcapsule 308 is substantially constant within e-paper display 300 and can be in one example between 20 µm and 100 µm, such as 50 µm. Counter-electrode 302 may be composed of a transparent conductive material, such as indium tin oxide. In one example, counter-electrode 302 has a thickness between 10 nm and 1 mm, or larger depending on how e-paper display 300 is to be used.

In other examples, e-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from counter-electrode 302. For example, the microcapsules with black particles located away from counter-electrode 302 reflect white light, corresponding to a white portion of an image displayed on e-paper display 300. In contrast, the microcapsules with black particles located near counter-electrode 302 appear black to a viewer 318 corresponding to a black portion of the image displayed on e-paper display 300. Various shades of gray can be created by using halftoning with black particles located near or away from counter-electrode 302.

Counter-electrode 302 may be tinted with alternating blue, red, and green regions. Adjacent blue, red, and green regions form color pixels. Color images are created by placing different combinations of white or black particles near counter-electrode 302. For example, the microcapsules of a color pixel with white particles located near the red and green regions of counter-electrode 302 reflect red and green light from e-paper display 300. The viewer 318 will perceive this combination as a yellow pixel. When the black particles in the microcapsules are located near counter-electrode 302, that color pixel will appear black to the viewer 318. Additionally or alternatively, the black particles 310 of each microcapsule can be replaced by blue, red, or green positively or negatively charged particles. The particles can be used alone or in combination with a tinted counter-electrode 302 to create a desired color image.

Figure 7:
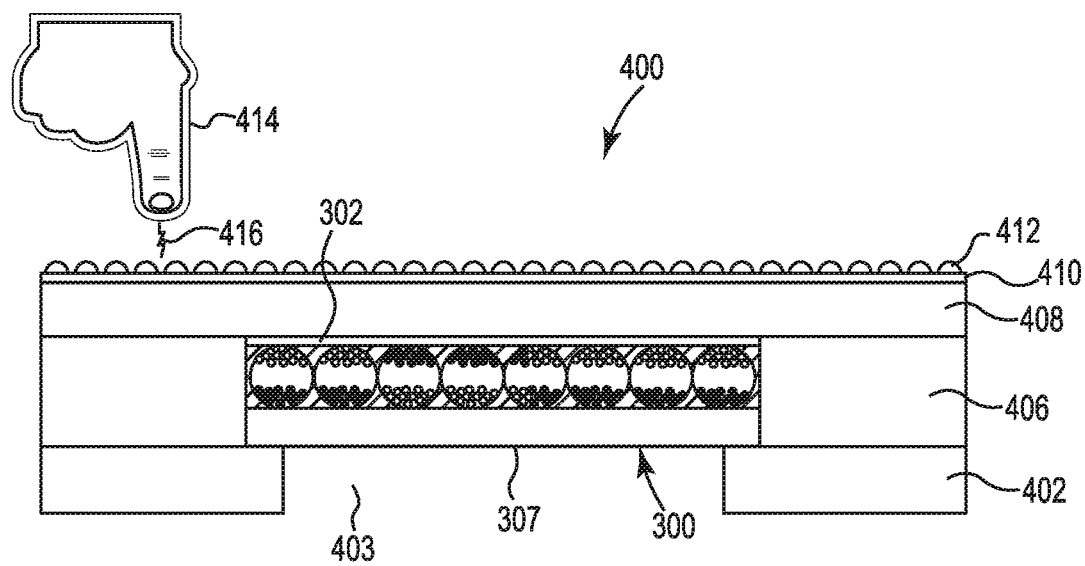
FIG. 7 is a cross-sectional view illustrating one example of a display device.

FIG. 7 is a cross-sectional view illustrating one example of a display device 400. Display device 400 includes a first layer 402, an e-paper display 300, a second layer 406, a third layer 408, a floating electrode 410, and a patterned layer 412. First layer 402 includes an opening 403 to expose the imaging surface 307 of e-paper display 300. First layer 402 may be composed of a nonconductive transparent or opaque material, such as a transparent or opaque polymer. First layer 402 is attached to second layer 406 and may cover a portion of e-paper display 300 around the edges of e-paper display 300.

E-paper display 300 includes a counter-electrode 302 opposite to the imaging surface 307 and facing third layer 408. E-paper display 300 is supported in an opening of second layer 406. Second layer 406 may be composed of a conductive material, such as a metal or a polycarbonate. The counter-electrode 302 of e-paper display 300 is electrically coupled to second layer 406. Third layer 408 is attached to second layer 406 and covers e-paper display 300. Third layer 408 may include a transparent window to e-paper display 300 to enable viewing of e-paper display 408 through counter-electrode 302. Third layer 408 may be composed of a nonconductive transparent material, such as a transparent polymer.

Floating electrode 410 is attached to third layer 408. Floating electrode 410 may be composed of a transparent conductive material, such as indium tin oxide or a polycarbonate. In one example, floating electrode 410 is a conductive coating that is applied to third layer 408. In another example, floating electrode 410 is a conductive film that is applied to third layer 408. Floating electrode 410 is capacitively coupled to counter-electrode 302 of e-paper display 300.

Patterned layer 412 provides mechanical protection for floating electrode 410 while enabling an air discharge 416 to floating electrode 410 from a user 414. Patterned layer 412 may be composed of an UV coating, a polymer coating, a water based coating, or another suitable nonconductive coating applied to floating electrode 410. Patterned layer 412 may cover between 5% and 95% of floating electrode 410 such that a portion of floating electrode 410 remains exposed. Patterned layer 412 has no effect on the function of floating electrode 410 when display device 400 is handled by a user. In addition, patterned layer 412 prevents scratches and/or other damage to floating electrode 410.

Floating electrode 410 and patterned layer 412 provide an area of display device 400 that a user 414 is likely to touch when first contacting display device 400. When a user 414 touches floating electrode 410 or patterned layer 412, floating electrode 410 is brought to the same potential as user 414. Through the capacitive coupling to counter-electrode 302 of e-paper display 300, counter-electrode 302 is brought to substantially the same potential as floating electrode 410. By bringing counter-electrode 302 to substantially the same potential as floating electrode 410, subsequent electric field/charge transfer between the user 414 and the imaging surface 307 of e-paper display 300 is minimized. Thus, the user's ability to alter the displayed image of e-paper display 300 by handling display device 400 is reduced.

Figure 8:
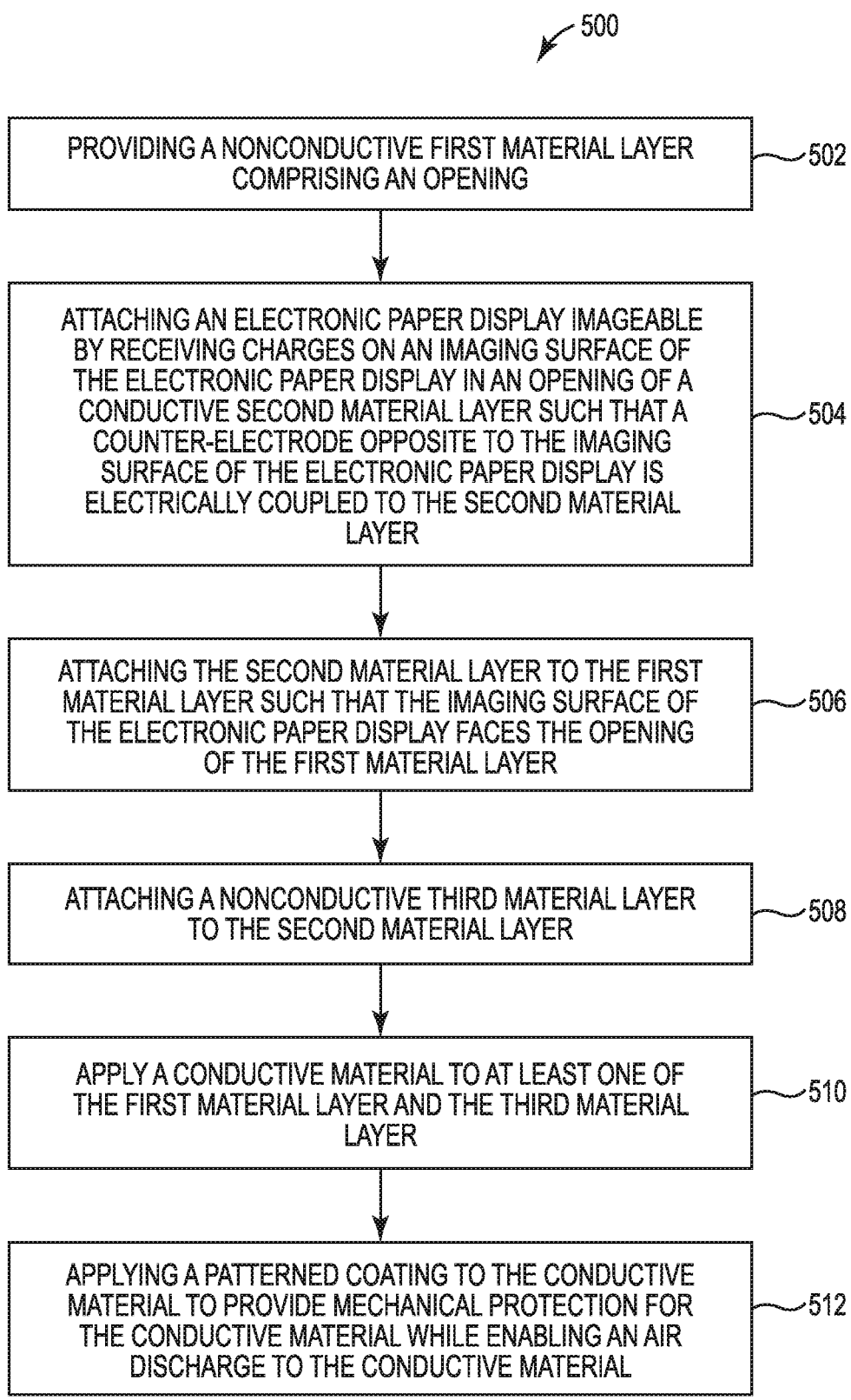
FIG. 8 is a flow diagram illustrating one example of a method for manufacturing a display device.

FIG. 8 is a flow diagram illustrating one example of a method 500 for manufacturing a display device. At 502, method 500 includes providing a nonconductive first material layer comprising an opening. At 504, method 500 includes attaching an electronic paper display imageable by receiving charges on an imaging surface of the electronic paper display in an opening of a conductive second material layer such that a counter-electrode opposite to the imaging surface of the electronic paper display is electrically coupled to the second material layer. At 506, method 500 includes attaching the second material layer to the first material layer such that the imaging surface of the electronic paper display faces the opening of the first material layer.

At 508, method 500 includes attaching a nonconductive third material layer to the second material layer. At 510, method 500 includes applying a conductive material to at least one of the first material layer and the third material layer. At 512, method 500 includes applying a patterned coating to the conductive material to provide mechanical protection for the conductive material while enabling an air discharge to the conductive material. In one example, applying the patterned coating comprises flexo printing the coating onto the conductive material. In another example, applying the patterned coating comprises inkjet printing the coating onto the conductive material.

By including a floating electrode capacitively coupled to the counter-electrode of the e-paper display of the display device, image robustness of the display device is improved by preventing electrostatic discharges from users from altering the image when the display device is handled by a user. In addition, by coating the floating electrode with a patterned layer, damage to the floating electrode is prevented while not altering the function of the floating electrode.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
an electronic paper display imageable by receiving charges on an imaging surface of the electronic paper display;
a counter-electrode opposite to the imaging surface of the electronic paper display;
a floating electrode capacitively coupled to the counter-electrode; and
a patterned layer on the floating electrode to provide mechanical protection for the floating electrode while enabling an air discharge to the floating electrode.

2. The display device of claim 1, wherein the patterned layer covers between 5% and 95% of the floating electrode.

3. The display device of claim 1, wherein the patterned layer is between 2 μm and 10 μm thick.

4. The display device of claim 1, wherein the patterned layer comprises a transparent material.

5. The display device of claim 1, wherein the patterned layer comprises an ultraviolet curable material.

6. The display device of claim 1, wherein the patterned layer is a halftoned layer or a screened layer.

7. A display device comprising:
a first layer having an opening;
a second layer attached to the first layer, the second layer supporting an electronic paper display imageable by receiving charges on an imaging surface of the electronic paper display through the opening of the first layer;
a third layer attached to the second layer opposite to the first layer, the third layer having a transparent window to the electronic paper display;
a floating electrode capacitively coupled to a counter-electrode of the electronic paper display; and
a patterned layer on the floating electrode to provide mechanical protection for the floating electrode while enabling an air discharge to the floating electrode.

8. The display device of claim 7, wherein the floating electrode comprises indium tin oxide.

9. The display device of claim 7, wherein the floating electrode comprises a conductive polymer.

10. The display device of claim 7, wherein the patterned layer comprises a nonconductive material.

11. The display device of claim 7, wherein the patterned layer has a thickness less than 18 μm.

12. The display device of claim 7, wherein the first layer comprises a polymer,
wherein the second layer comprises a conductive material electrically coupled to the counter-electrode of the electronic paper display, and
wherein the third layer comprises a polymer.

13. A method of manufacturing a display device, the method comprising:
providing a nonconductive first material layer comprising an opening;
attaching an electronic paper display imageable by receiving charges on an imaging surface of the electronic paper display in an opening of a conductive second material layer such that a counter-electrode opposite to the imaging surface of the electronic paper display is electrically coupled to the second material layer;
attaching the second material layer to the first material layer such that the imaging surface of the electronic paper display faces the opening of the first material layer;
attaching a nonconductive third material layer to the second material layer;
applying a conductive material to at least one of the first material layer and the third material layer; and
applying a patterned coating to the conductive material to provide mechanical protection for the conductive material while enabling an air discharge to the conductive material.

14. The method of claim 13, wherein applying the patterned coating comprises flexo printing the coating onto the conductive material.

15. The method of claim 13, wherein applying the patterned coating comprises inkjet printing the coating onto the conductive material.

16. The display device of claim 1, wherein a portion of the floating electrode is exposed.

17. The display device of claim 1, wherein the floating electrode comprises indium tin oxide.

18. The display device of claim 1, wherein the patterned layer comprises a nonconductive material.

19. The display device of claim 1, wherein the floating electrode comprises a conductive polymer.

20. The display device of claim 1, wherein the electronic paper display is imageable by receiving charges ejected from a writing module onto the imaging surface of the electronic paper display.

* * * * *